| United States Patent [19] | [11] | 4,427,791 |
|---|---|---|
| Miale et al. | [45] | Jan. 24, 1984 |

[54] ACTIVATION OF INORGANIC OXIDES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 355,414

[22] Filed: Mar. 8, 1982

[51] Int. Cl.³ .................... B01J 21/02; B01J 23/08
[52] U.S. Cl. .................... 502/203; 502/231; 502/355
[58] Field of Search .................... 252/433, 442, 463

[56] References Cited

U.S. PATENT DOCUMENTS

| 3,086,064 | 4/1963 | Cohen | 252/442 X |
| 3,114,785 | 12/1963 | Hervert et al. | 252/433 X |
| 3,433,747 | 3/1969 | Magee, Jr. et al. | 252/433 |
| 3,435,085 | 3/1969 | White et al. | 252/442 X |

*Primary Examiner*—Carl F. Dees
*Attorney, Agent, or Firm*—Alexander J. McKillop; Michael G. Gilman; Dennis P. Santini

[57] ABSTRACT

A method for enhancing the activity of inorganic oxide materials is disclosed which involves treating same with a fluoride reagent of ammonium fluoride or boron fluoride, contacting the fluoride reagent contacted material with an ammonium exchange solution and then calcining the final product.

9 Claims, No Drawings

ACTIVATION OF INORGANIC OXIDES

CROSS-REFERENCE TO RELATED CASES

This application is related by subject to the copending applications identified as follows:

| Serial Number | Filing Date | Serial Number | Filing Date |
|---|---|---|---|
| 319,175 | November 9, 1981 | 333,370 | December 22, 1981 |
| 355,419 | Herewith | 355,418 | Herewith |
| 355,417 | Herewith | 355,416 | Herewith |
| 355,414 | Herewith | 355,413 | Herewith |
| 355,446 | Herewith | 355,420 | Herewith |

BACKGROUND OF THE INVENTION

1. Field of the Invention

This invention relates to a method for enhancing the acid catalytic activity of inorganic oxide material such as alumina or gallia which involves the steps of contacting the material with a reagent selected from the group consisting of ammonium fluoride and boron fluoride, contacting the reagent contacted material with an aqueous ammonium exchange solution such as ammonium hydroxide or salt, and calcining the ammonium hydroxide or salt solution contacted material.

2. Description of Prior Art

The inorganic oxide material alumina has been provided with catalytic activity in the past by contacting same with boron fluoride ($BF_3$). The contacting has been followed by hydrolysis and calcination. Crystalline aluminosilicates such as zeolites X and Y have been enhanced in catalytic activity by treatment with volatile metal halides. This is shown in U.S. Pat. Nos. 3,354,078 and 3,644,220.

The present method, however, provides various inorganic oxides, such as alumina and gallia, with significantly higher acid catalytic activity than prior art methods. This makes it possible to supply matrices of much wider range of acidity levels for commercial zeolite catalysts for use in cracking, alkylation and isomerization reactions.

SUMMARY OF THE INVENTION

The present invention relates to a novel process for improving acid activity of certain inorganic oxide material, such as alumina or gallia, which comprises the sequential steps of contacting said material with ammonium fluoride or volatile boron fluoride, contacting the boron fluoride or ammonium fluoride contacted material with an aqueous ammonium exchange solution such as the hydroxide or salt, e.g. nitrate, and calcining said ammonium exchange solution contacted material. The resulting material exhibits enhanced Bronsted acidity and, therefore, improved acid activity toward catalysis of numerous chemical reactions, such as, for example, alkylation, transalkylation, cracking or isomerization of organic, e.g. hydrocarbon, compounds. This enhanced acid activity material is useful as matrix or support for various zeolite materials in the manufacture of catalyst for acid catalyzed organic compound conversion processes.

DESCRIPTION OF SPECIFIC EMBODIMENTS

The novel process of this invention is concerned with the treatment of inorganic oxide material. It is simple and easy to carry out although the results therefrom are dramatic. The process is carried out by contacting the inorganic oxide material with a reagent of ammonium fluoride or volatile boron fluoride at a temperature of from about 0° C. to about 100° C., preferably from about ambient to about 50° C. The boron or ammonium fluoride contacted material is then contacted with an aqueous ammonium hydroxide or salt solution, e.g. 1 $NH_4NO_3$ or 1N $NH_4OH$, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The fluoride reagent contacting step may be accomplished by admixture of volatile boron fluoride or boron fluoride etherate with an inert gas such as nitrogen or helium at temperatures ranging from about 0° C. to about 100° C. It may be accomplished by vacuum impregnation of the inorganic oxide material with ammonium fluoride in water. The amount of fluoride reagent which is utilized is not narrowly critical but usually from about 0.02 to about 2 grams of boron fluoride or ammonium fluoride are used per gram of inorganic oxide material.

The aqueous ammonium exchange solution contacting step may be conducted for a period of time of from about 1 to about 20 hours at a temperature of from ambient to about 100° C. The actual ammonium exchange material which may be used is not narrowly critical and will normally be an inorganic salt, such as ammonium nitrate, ammonium sulfate, ammonium chloride, etc., or ammonium hydroxide The use of boron fluoride in the presence of siliceous materials is a problem because boron fluoride is easily hydrolyzed and the HF thereby released attacks silica. Therefore, the inorganic oxide to be treated hereby with boron fluoride will not include silica or mixtures involving silica. If the inorganic oxide material does comprise silica, the present method utilizing a reagent of ammonium fluoride would be the desired procedure.

The inorganic oxide material to be acid activity enhanced by the present method way, if desired, be calcined prioir to fluoride reagent contact at a temperature of from about 200° C. to about 600° C. in an atmosphere of air, nitrogen, etc. for between 1 minute and 48 hours.

The activity enhanced inorganic oxide material prepared by the present method is useful as a catalyst component for acid catalyzed organic compound conversion reactions. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 to about 20; and conversion of methanol to gasoline wherein the reaction conditions include a temperature of from about 300° C. to about 550° C., a pressure of from about 5 psia to about 500 psia, and a weight hourly space velocity of from about 0.1 to about 100.

In practicing a particularly desired chemcial conversion process, it may be useful to incorporate the above-described activity enhanced inorganic oxide material, especially when used as matrix in a zeolite-containing catalyst composition, with additional matrix comprising another material resistant to the temperature and other conditions employed in the process. Such additional matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced inorganic oxide component and additional matrix, on an anhydrous basis, may vary widely with the activity enhanced material content of the overall catalyst ranging from about 1 to about 99 percent by weight and more usually in the range of about 5 to about 80 percent by weight of the total dry composite.

The following examples will illustrate the novel method of the present invention.

EXAMPLE 1

A one gram sample of Kaiser gamma-alumina was vacuum impregnated with 0.9 grams of ammonium fluoride ($NH_4F$) in water at a temperature of 25° C. It was noted that during this step considerable ammonia was evolved. After 30 minutes contact, the ammonium fluoride contacted material was dried at 130° C., and then treated three times with 1N aqueous ammonium nitrate ($NH_4NO_3$) solution. Each ammonium nitrate contact was followed by water washing. The finally washed material was then dried at 130° C. and calcined for 30 minutes at 538° C. in air.

EXAMPLE 2

A one gram sample of the same alumina as used in Example 1 was saturated with boron fluoride ($BF_3$). The $BF_3$ addition was carried out at 25°-95° C. The saturation point was determined as the point at which heat of adsorption no longer evolved. Any further addition of the $BF_3$ at this point would have actually cooled the alumina. At the saturated point the flow of boron fluoride was stopped and 25° C. (ambient) air was drawn through the alumina for 30 minutes. The boron fluoride contacted material was then dried at 130° C. for 30 minutes to remove the last traces of unreacted or lightly held boron fluoride. The dried material was then treated with 1N aqueous solution of $NH_4NO_3$ and calcined as in Example 1.

EXAMPLE 3

A sample of UOP bimodal gamma-alumina beads was treated with $BF_3$ as in Example 2 without $NH_4NO_3$ treatment. The boron fluoride contacted alumina was calcined as above. This was a prior art method for alumina activation conducted for comparison purposes.

EXAMPLE 4

Another sample of the bimodal alumina beads was treated with $BF_3$ as in Example 3, hydrolyzed with demineralized water and calcined as above. There was no aqueous ammonium hydroxide or salt treatment. This, again, was a prior art method for alumina activation conducted for comparison purposes.

EXAMPLE 5

Another sample of the bimodal alumina beads was treated as in Example 2.

EXAMPLE 6

The final product inorganic oxide materials from Examples 1 through 5 along with samples of the two aluminas used (untreated) were subjected to the Alpha Test with results listed below:

| Products of Example | Alpha Value |
| --- | --- |
| gamma-alumina (base) | 0.2 |
| bimodal alumina beads (base) | 0.2 |
| 1 ($NH_4F/NH_4NO_3$/calcination) | 4.5 |
| 2 ($BF_3/NH_4NO_3$/calcination) | 15 |
| 3 ($BF_3$/calcination) | 2.8 |
| 4 ($BF_3/H_2O$/calcination) | 8.7 |
| 5 ($BF_3/NH_4NO_3$/calcination) | 23 |

It is observed from the above results that the present method is highly useful for enhancing acid catalytic activity of certain inorganic oxide materials. Comparison of the Alpha Values for the products of Examples 1 and 2 with that of untreated gamma-alumina indicates a 2150 to 7400 percent enhancement in activity. Comparison of the Alpha Value for the product of Example 5 with that of untreated bimodal alumina beads indicates a 11,400 percent enhancement in activity. Comparison of the results for Example 5 material with those for the materials of Examples 3 and 4 show the improvement provided by the present method over the prior art techniques.

As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysis, Vol. IV, pp. 522–529 (August 1965).

What is claimed is:

1. A method for enhancing the activity of an inorganic oxide material, which comprises contacting said material with a fluoride reagent selected from the group consisting of ammonium fluoride and boron fluoride at a temperature of from about 0° C. to about 100° C., contacting said fluoride reagent contacted material with an aqueous ammonium exchange solution and thereafter calcining said material at a temperature of from about 200° C. to about 600° C. in order to obtain an inorganic oxide material having enhanced activity.

2. The method of claim 1 wherein said inorganic oxide material is alumina or gallia.

3. The method of claim 2 wherein said aqueous ammonium exchange solution is selected from the group consisting of ammonium hydroxide and an ammonium salt.

4. The method of claim 3 wherein said ammonium salt is selected from the group consisting of ammonium nitrate, ammonium sulfate and ammonium chloride.

5. The method of claim 1 wherein said inorganic oxide material is calcined prior to contact with the fluoride reagent at a temperature of from about 200° C. to about 600° C.

6. An inorganic oxide material having enhanced activity prepared by the method of claim 1, 2, 3, 4 or 5.

7. The method of claim 1 wherein said fluoride reagent contacting is at a temperature of from about ambient to about 50° C.

8. The method of claim 2 wherein said alumina is gamma-alumina.

9. The method of claim 1 wherein said inorganic oxide material is in the form of beads.

* * * * *